UNITED STATES PATENT OFFICE.

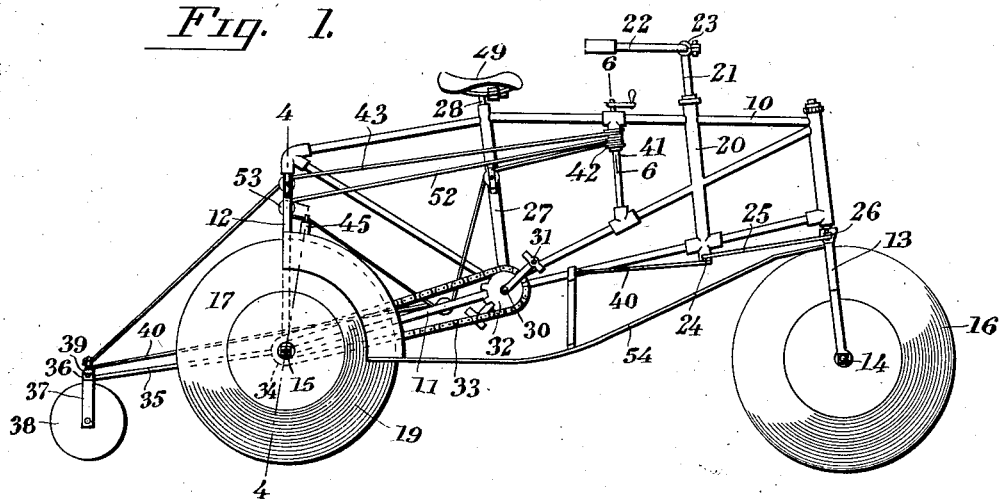

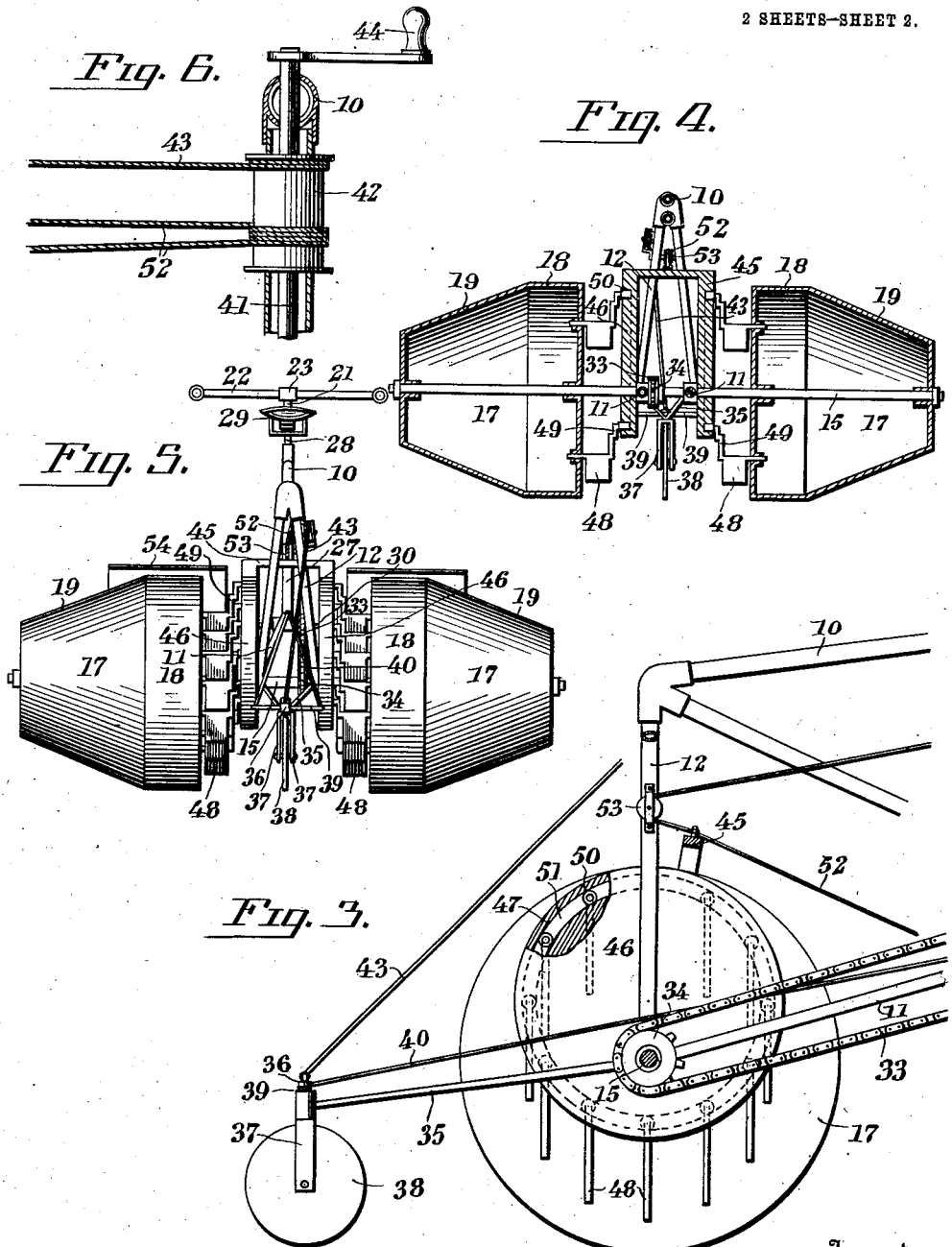

MILTON M. MALLORY, OF SPRINGFIELD, OREGON.

TRICYCLE.

1,083,115.

Specification of Letters Patent.

Patented Dec. 30, 1913.

Application filed November 13, 1912. Serial No. 731,152.

*To all whom it may concern:*

Be it known that I, MILTON M. MALLORY, a citizen of the United States, residing at Springfield, in the county of Lane and State of Oregon, have invented new and useful Improvements in Tricycles, of which the following is a specification.

The invention relates to tricycles and more particularly to the class of combination tricycles.

The primary object of the invention is the provision of a tricycle of this character which may be used for traveling either upon land or water, and is capable of manual manipulation for the driving and guiding thereof in any preferred course.

Another object of the invention is the provision of a device of this character in which the water pedals are held in a novel manner so as to enter and leave the water when the device is traveling thereon and to effect maximum power for the driving of the said device.

A further object of the invention is the provision of a device of this character in which pedals may be raised and lowered so that the said device can travel in shallow or deep water and also may be driven upon the ground surface without liability of the pedals interfering with the travel thereof.

A still further object of the invention is the provision of a device of this character which is simple in construction, thoroughly reliable and efficient in its operation, strong, durable, and inexpensive in manufacture.

With these and other objects in view the invention consists in the construction, combination and arrangement of parts as will be hereinafter more fully described, illustrated in the accompanying drawings, and pointed out in the claims hereunto appended.

In the drawings: Figure 1 is a side elevation of a tricycle constructed in accordance with the invention. Fig. 2 is a top plan view thereof. Fig. 3 is a fragmentary vertical longitudinal sectional view through the device. Fig. 4 is a sectional view on the line 4—4 of Fig. 1. Fig. 5 is a rear elevation. Fig. 6 is a sectional view on the line 6—6 of Fig. 1.

Similar reference characters indicate corresponding parts throughout the several views in the drawings.

Referring to the drawings by numerals, the machine or tricycle comprises a main frame 10 preferably formed from metal tubing having a lower rear fork 11 an upper fork 12 and a front turning fork 13, the said forks being designed to support front and rear axles 14 and 15 which are journaled therein in any suitable manner, and upon the axle 14 is supported a front wheel 16, while supported upon the rear axle 15 is a pair of rear wheels 17, each of the latter being formed with a straight tread 18 and an outwardly tapered tread 19 respectively.

The front wheel has its straight tread 18 medially thereof, while the two rear wheels 17 have their straight tread at the inner ends thereof. Suitably mounted in the frame 10 rearwardly of the front turning fork is a steering shaft post 20 in which is mounted a steering rod 21 to the upper end of which is connected a handle bar 22 by means of a clamp 23 integrally formed with the shaft 21, while carried at the lower end of the latter is a cross piece 24 to which are pivotally connected forwardly extending steering rods 25, the same being also pivotally connected to the crown 26 of the front fork so that upon manipulation of the handle bar 22 the said fork can be turned for the guiding of the front wheel 16 as will be clearly apparent. Formed in the frame 10 rearwardly of the steering post 20 is a saddle post 27 in which is adjustably mounted a seat stem 28 carrying a saddle 29 of the ordinary well-known construction, which is to be occupied by the operator of the machine. Suitably journaled in the seat post 27 is a driving axle 30 the same being formed with crank pedals and on the shaft 30 is fixed a sprocket wheel 32 over which is trained a driving sprocket chain 33, the same being also trained over a sprocket gear 34 fixed to the rear axle 13 so that on pedaling by the rider the machine can be guided in the desired direction. Swingingly connected to the rear axle 13 and extending rearwardly therefrom is a rudder frame 35, in which is rotatably mounted the vertical stem 36 of a turning fork 37, which has journaled therein a rotatable rudder wheel 38, the stem 36 at its upper end being formed with oppositely extending arms 39 to which are connected steering cables 40, which are connected to the cross piece 24 of the steering shaft 21, the cables 40 being crossed so that on the turning of the shaft 21, the rudder wheel 38 will be shifted in a reverse direction to the shifted position of the front wheel, thereby properly guiding the machine in its course.

Suitably journaled in the frame 10 between the steering shaft posts 20 and the seat post 27 is a turning shaft 41, the same carrying a winding and unwinding drum 42 to which is connected one end of a lift cable 43, the same being fixed to the rudder frame 35, so that on the winding of the cable 43 upon the drum 42 the said frame 35 can be raised and on reversely turning the shaft the latter may be lowered with respect to the ground. This shaft 41 is formed with a hand crank 44 which permits the convenient manipulation thereof for the raising and lowering of the rudder frame 35 as the occasion may require.

Swingingly connected to the rear axle 15 is an inverted U-shaped frame 45 to which are fixed circular shaped guide members 46 which are eccentrically disposed with respect to the said rear axle 13 and each of which has formed thereon a circular guide groove or channel 47 near the outer periphery thereof, while pivoted eccentrically with respect to the axis of the rear wheel 17 at the inner ends thereof are paddle blades 48, the same being formed with guide arms 49 carrying friction rollers 50 at their free inturned ends, the rollers being designed to engage and travel in the guide grooves or channels 47 in the member 46, so that upon the rotation of the rear wheels 17 the paddle blades 48 will be sustained in proper working relation with respect to a body of water, so that the said blades will freely enter and leave the water without impeding the forward travel of the machine. The arms 49 of the blades are loosely engaged in rings 51 which sustain the paddles in spaced relation to each other and at equal distance apart during the rotation of the rear wheel 17 when the machine is being operated. The tapered formation of the front and rear wheels 16 and 17 will prevent the toppling over of the machine when making a curve and said wheels are of hollow formation so as to give requisite buoyancy to the machine when afloat in a body of water.

The drum 42 fixed to the shaft 41 has connected thereto the ends of a raising and lowering cable 52 which ends are adapted to be reversely wound or wrapped with respect to each other upon the said drum, while connected at a point intermediate the ends of said cable 52 is the frame 45, the cable being trained over guide pulleys 53, two of which are fixed to the rear forks 11 and 12 respectively of the frame of the machine, while the other pulley is mounted upon the post 27, thus it being seen that on turning the shaft 41 one end of the cable will be unwound therefrom while the opposite end will be wound thereon, causing the swinging of the frame 45 for the raising or lowering of the same, and in this manner the guide members 46 will be shifted for the raising or lowering of the paddles 48 to permit the machine to travel in shallow or deep water. It will be apparent that when the guide members 46 are turned slightly about the shaft 15 the paddles 48 will be altered or shifted by reason of their connection with the said guide members because the eccentric relation of the guide members will be changed with respect to the rear wheels or rollers 17 as the guide members can be thrown in their eccentric relation either forwardly or rearwardly with respect to the axle 15 carrying the rollers 17 thereby slanting the paddles 48 from perpendicular position as shown in Fig. 3 of the drawing.

Suitably secured to the frame 10 and extended throughout a greater portion of the length thereof and partially over the upper portions of the rear wheels 17 is a shield or mud and water guard 54, which prevents the splashing of water upon the rider of the machine as well as protecting the said rider from mud or dirt lifted by the wheels during the travel of the machine.

From the foregoing description taken in connection with the accompanying drawings, it is thought that the construction and operation of the invention will be clearly understood, and therefore, a more extended explanation has been omitted.

What is claimed is:

1. A device of the class described comprising a frame, front and rear wheels journaled in said frame, guide members mounted between the rear wheels and swingingly connected with their axis, the said guide members being eccentrically disposed with respect to the axis of the rear wheels and having circular guide grooves therein, a plurality of paddle blades pivotally mounted concentrically with respect to their axes and arms extending from the paddle blades and engageable in the grooves in the guide members whereby on the rotation of the rear wheels the said paddle blades will be actuated for the driving of the machine.

2. A device of the class described comprising a frame, front and rear wheels journaled in said frame, guide members mounted between the rear wheels and swingingly connected with their axis, the said guide members being eccentrically disposed with respect to the axis of the rear wheels and having circular guide grooves therein, a plurality of paddle blades pivotally mounted concentrically with respect to their axes, arms extending from the paddle blades and engageable in the grooves in the guide members whereby on the rotation of the rear wheels the said paddle blades will be actuated for the driving of the machine, and means for driving the rear wheels, 3. A device of the class described comprising a frame, front and rear wheels journaled in said frame, guide members mounted between the rear wheels and swingingly connected with their axis, the said guide members being eccentrically disposed with respect to the axis of the rear wheels and having circular guide grooves therein, a plurality of paddle blades pivotally mounted concentrically with respect to their axes, arms extending from the paddle blades and engageable in the grooves in the guide members whereby on the rotation of the rear wheels the said paddle blades will be actuated for the driving of the machine, means for driving the rear wheels, and means for shifting the guide members for changing the disposition of the paddle blades.

4. A device of the class described comprising a frame, front and rear wheels journaled in said frame, guide members mounted between the rear wheels and swingingly connected with their axis, the said guide members being eccentrically disposed with respect to the axis of the rear wheels and having circular guide grooves therein, a plurality of paddle blades pivotally mounted concentrically with respect to their axes, arms extending from the paddle blades and engageable in the grooves in the guide members whereby on the rotation of the rear wheels the said paddle blades will be actuated for the driving of the machine, means for driving the rear wheels, means for shifting the guide members for changing the disposition of the paddle blades, and means for steering the front wheel.

5. A device of the class described comprising a frame, front and rear wheels journaled in said frame, guide members mounted between the rear wheels and swingingly connected with their axis, the said guide members being eccentrically disposed with respect to the axis of the rear wheels and having circular guide grooves therein, a plurality of paddle blades pivotally mounted concentrically with respect to their axes, arms extending from the paddle blades and engageable in the grooves in the guide members whereby on the rotation of the rear wheels the said paddle blades will be actuated for the driving of the machine, means for driving the rear wheels, means for shifting the guide members for changing the disposition of the paddle blades, means for steering the front wheel, and rudder mechanism arranged rearwardly of and connected with the frame and having connection with the last named means.

6. A device of the class described comprising a frame, front and rear wheels journaled in said frame, guide members mounted between the rear wheels and swingingly connected with their axis, the said guide members being eccentrically disposed with respect to the axis of the rear wheels and having circular guide grooves therein, a plurality of paddle blades pivotally mounted concentrically with respect to their axes, arms extending from the paddle blades and engageable in the grooves in the guide members whereby on the rotation of the rear wheels the said paddle blades will be actuated for the driving of the machine, means for driving the rear wheels, means for shifting the guide members for changing the disposition of the paddle blades, means for steering the front wheel, rudder mechanism arranged rearwardly of and connected with the frame and having connection with the last named means, and means for raising and lowering the rudder mechanism.

In testimony whereof I affix my signature in presence of two witnesses.

MILTON M. MALLORY.

Witnesses:
  B. A. TUTTEN,
  J. P. FRY.